United States Patent
Jejcic

(10) Patent No.: US 8,322,274 B2
(45) Date of Patent: Dec. 4, 2012

(54) MACHINE FOR PRODUCING ICE-CREAM AND THE LIKE

(75) Inventor: Valter Jejcic, Nova Gorica (SI)

(73) Assignee: Valmar Global VSE ZA Sladoled D.O.O., Volcja Draga (SI)

( * ) Notice: Subject to any disclaimer, the term of this patent is extended or adjusted under 35 U.S.C. 154(b) by 568 days.

(21) Appl. No.: 12/687,235

(22) Filed: Jan. 14, 2010

(65) Prior Publication Data

US 2010/0175565 A1 Jul. 15, 2010

(30) Foreign Application Priority Data

Jan. 15, 2009 (IT) .............................. TO2009A0025

(51) Int. Cl.
*A23G 9/04* (2006.01)

(52) U.S. Cl. ........................................................ 99/455

(58) Field of Classification Search .................... 99/455, 99/517; 62/228.2, 46.1, 305; D15/82, 79
See application file for complete search history.

(56) References Cited

U.S. PATENT DOCUMENTS

| 2,021,153 A | 11/1935 | Sawyer |
| 2,263,794 A | 11/1941 | Wyen |
| 3,958,968 A | 5/1976 | Hosaka |

FOREIGN PATENT DOCUMENTS

| DE | 2706594 A1 | 8/1977 |
| DE | 19802852 A1 | 9/1998 |
| EP | 1310750 A2 | 5/2003 |
| EP | 1787526 A1 | 5/2007 |
| NL | 7307285 A | 11/1973 |

*Primary Examiner* — Gene Kim
*Assistant Examiner* — Amir Klayman
(74) *Attorney, Agent, or Firm* — Robert P. Lenart, Esq.; Pietragallo Gordon Alfano Bosick & Raspanti, LLP

(57) ABSTRACT

A machine for producing ice-cream and the like including an outer boxlike housing, a processing tank that extends into the boxlike housing, and a discharge manifold which branches from the bottom of the processing tank to reach the boxlike housing at a front wall of the latter, and is structured so as to allow a product contained in the processing tank to flow out of the machine. The discharge manifold includes a tubular duct which protrudes from the bottom of the processing tank and ends with a mouth assembly which through-engages an appropriate opening obtained on the front wall of the boxlike housing. The mouth assembly includes a central sleeve that is rigidly and fixedly attached to the tubular duct.

14 Claims, 3 Drawing Sheets

MACHINE FOR PRODUCING ICE-CREAM AND THE LIKE

CROSS-REFERENCE TO A RELATED APPLICATION

This application claims the benefit of Italian Patent Application No. TO2009A 000025 filed on Jan. 15, 2009, which is incorporated herein by reference.

FIELD OF THE INVENTION

The present invention relates to a machine for producing ice-cream and the like with a vertical-axis processing tank.

More in detail, the present invention relates to a batch freezer for producing ice-cream and the like with a vertical-axis processing tub, to which the following description refers purely by way of example without implying any loss of generality.

BACKGROUND OF THE INVENTION

As is known, nearly all batch freezers which are currently used for the production of homemade ice-cream are provided with a processing tank having a "horizontal axis".

More specifically, nearly all batch freezers which are currently used for producing handmade ice-cream comprise a substantially parallelepiped-shaped outer boxlike housing; a cylindrical processing tank extending into the boxlike housing, from the front face of the same housing, while remaining coaxial to a substantially horizontal reference axis; and a porthole-shaped closing door, which is hinged onto the front face of the boxlike housing so as to be able to rotate about a vertical axis, and to be placed to close the inlet of the processing tank.

The above-mentioned batch freezers further comprise: an inner cooling circuit, which is able to bring and hold the processing tank and its content at a temperature lower than 0° C.; a mixing member which is rotatably mounted within the processing tub so as to be able to uniformly mix the various ingredients during the ice-cream creaming process; and finally an electric motor able to drive into rotation the mixing member within the processing tub.

The mixing member is further designed so as to be able to scrape the inner cylindrical surface of the processing tub, and possibly also the bottom of the same tub, so as to prevent, during the creaming process, the high viscosity mixture formed within the processing tub from stably adhering to the side wall and to the bottom of the tub, thus compromising the quality of the produced handmade ice-cream.

Obviously, the closing door of the batch freezer must be designed so as to fluid-tightly close the inlet of the processing tub, and to successfully retain the mixture within the processing tub during the final steps of the creaming process, when viscosity and consistency of the mixture reach particularly high values.

Furthermore, on the market there are some models of batch freezer for the production of handmade ice-cream, which are provided with a "vertical axis" processing tank.

This type of machines for producing handmade ice-cream, however, put on view from the beginning a series of problems which considerably hindered their diffusion. These problems mainly derive from the fact that this type of batch freezer is provided with two separate openings which allow to simultaneously access the processing tank, and therefore it must be provided with two different protection systems, each of which is designed to indicate when a respective inlet of the processing tank is not closed by the corresponding lid/door.

In "vertical axis" batch freezers, in fact, the processing tank is placed on the top of the boxlike housing, in a vertical position, and is provided with an ice-cream discharge manifold which connects the bottom of the processing tank to an outlet mouth located on the front face of the boxlike housing, and which is unfortunately sized so as to allow the introduction of a hand, with all the risks that this implies.

SUMMARY OF THE INVENTION

An aim of the present invention is therefore to provide a batch freezer for producing homemade ice-cream with a vertical-axis processing tank, which has a passive safety degree comparable to that of a batch freezer with a horizontal-axis processing tank, which is also cheap to produce.

In compliance with the above aim, according to the present invention there is provided a machine for producing ice-cream and the like, as claimed in the attached claims.

BRIEF DESCRIPTION OF THE DRAWINGS

A non-limiting embodiment of the present invention will now be described by way of example with reference to the accompanying drawings, in which:

FIG. 2 is a side view of the FIG. 1 machine with parts in section and parts removed for clarity; whereas

DETAILED DESCRIPTION OF THE INVENTION

Figure 1:
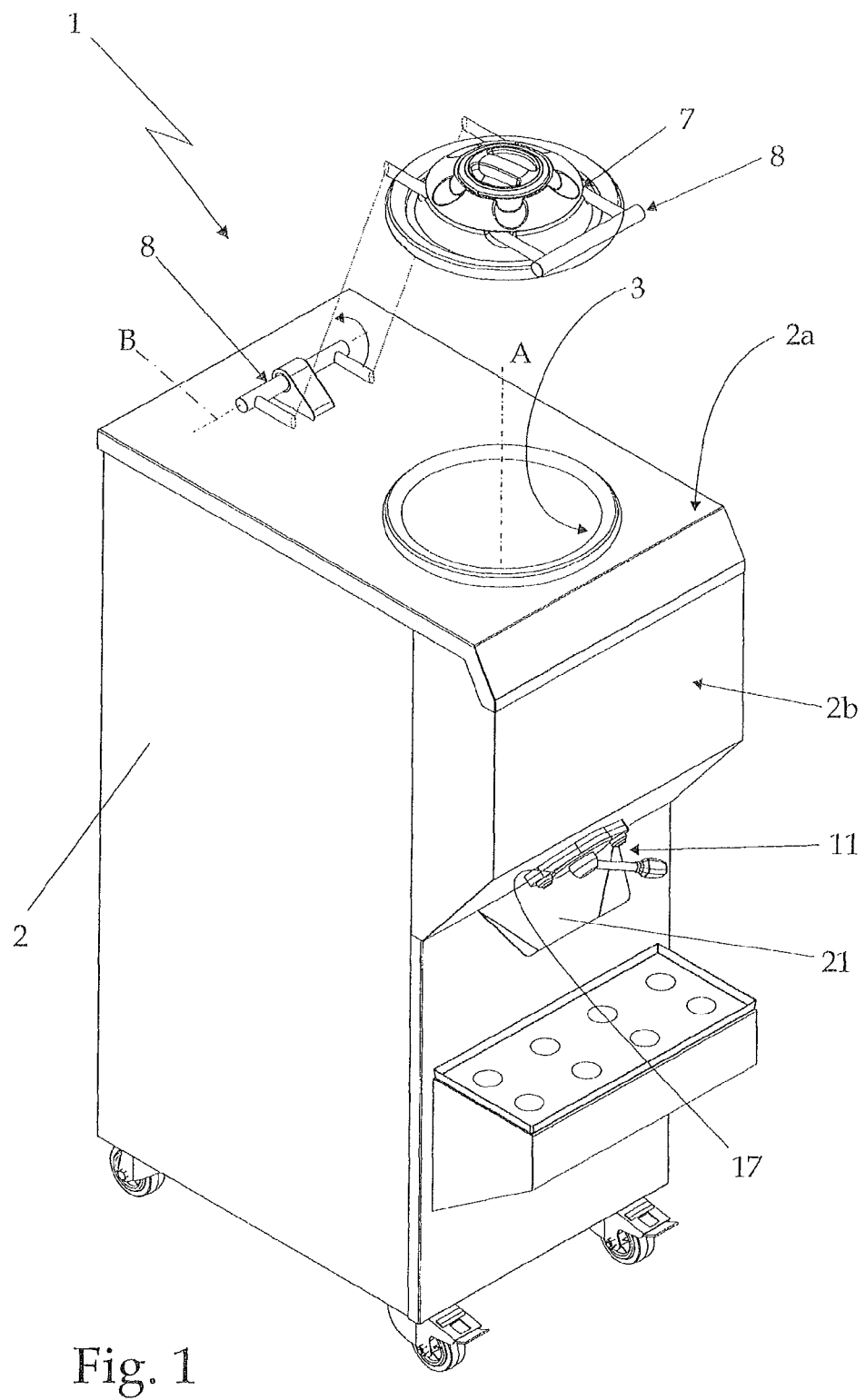
FIG. 1 shows a perspective view with parts removed for clarity, of the upper part of a machine for producing ice-cream and the like, realized in accordance with the teachings of the present invention.
Figure 2:
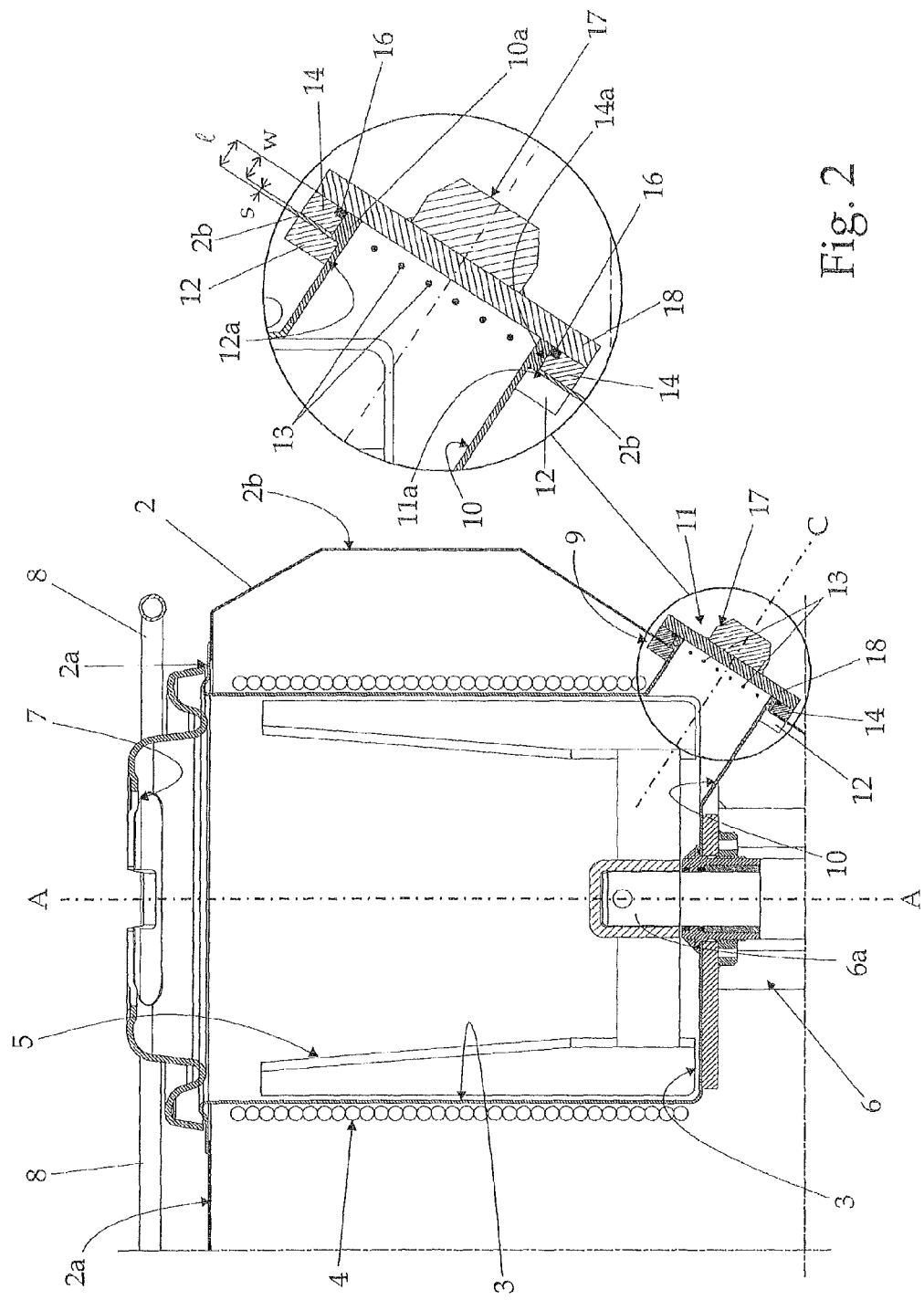

With reference to FIGS. 1 and 2, number 1 indicates as a whole a machine for producing ice-cream and the like, and more specifically a batch freezer 1 for producing handmade ice-cream and similar confectionary products.

Machine 1 essentially comprises an outer boxlike housing 2 which is rigid and preferably, though not necessarily, parallelepiped in shape; and a substantially cylindrical-shaped processing tub 3, which is suitable for collecting inside itself the various ingredients which are to be creamed for producing the desired amount of ice-cream, and which extends into the boxlike housing 2, from the upper wall 2a of the housing, while remaining coaxial to a substantially vertical reference axis A. Moreover, axis A is preferably, though not necessarily, locally substantially perpendicular to the outer surface of the upper wall 2a, so that the inlet of the processing tub 3 is defined by a substantially circular opening.

In particular, in the example shown, boxlike housing and processing tank 3 are preferably, though not necessarily, made of metal material, and the processing tank 3 has a nominal diameter preferably, though not necessarily, ranging between 15 and 45 centimeters.

With reference to FIG. 2, machine 1 further comprises an inner cooling circuit 4 preferably, though not necessarily, of the heat-pump type, which is housed within boxlike housing 2, and is structured so to be able, on command, to cool the processing tub 3 to bring and hold its content at a temperature lower than 0° C., and preferably ranging between −5° C. and −35° C.; and a mixing member 5 which is rotatably mounted within the processing tub 3 about a rotation axis substantially coinciding with the longitudinal axis A of the tub, so as to be able to mix and uniformly blend the various ingredients which are poured into the tub during the creaming process for making the handmade ice-cream.

Mixing member 5 is further structured so as to be able to continuously scrape the inner cylindrical surface of the processing tub 3, and possibly also the bottom of the same tub, so as to prevent, during the creaming process, the high viscosity mixture formed within the processing tub 3 from stably adhering to the cylindrical side wall and to the bottom of the tub, due to the low temperature reached by the latter.

With reference to FIGS. 1 and 2, machine 1 is further provided with a drive unit 6 which is housed within the boxlike housing 2, and is mechanically coupled to the mixing member 5 so as to be able to drive, on command, the mixing member into rotation about the longitudinal axis A; and with a manually operated movable lid 7, which is able to completely close the inlet of the processing tank 3.

More specifically, drive unit 6 is preferably, though not necessarily, located immediately underneath the processing tub 3, and includes an electric motor of known type (not shown) and a gear reduction unit provided with a rotating drive shaft 6a which extends through the bottom of the processing tub 3, and projects into the processing tub 3 while remaining locally coaxial to the rotation axis of mixing member 5, i.e. to the longitudinal axis A of the tub. The drive shaft 6a is driven into rotation by the electric motor, and the mixing member 5 is structured so as to be fixable in a stable, but easily removable manner, onto the upper end of drive shaft 6a, coupling with the latter in an angularly integral manner.

With reference to FIGS. 1 and 2, in the example shown, movable lid 7 consists of a cup-shaped body 7 substantially circular in shape, which is dimensioned so as to completely cover the inlet of the processing tank 3, and is manually displaceable by the operator between a closing position (see FIG. 1) in which the cup-shaped body 7 rests on the upper wall 2a of the boxlike housing 2, in upside down position, so as to completely cover the inlet of processing tank 3; and an opening position in which the cup-shaped body 7 is located away from the inlet of processing tank 3 so as to allow free access to processing tank 3.

More specifically, cup-shaped body 7 is preferably, though not necessarily, cantileverly fixed to the central length of a supporting arm 8 which, in turn, is hinged to the upper wall 2a of the boxlike housing 2 at one end, so as to be able to freely rotate about a substantially horizontal articulation axis B, between a completely lowered position in which arm 8 rests in a substantially horizontal position, astride of the inlet of the processing tub 3 (see FIGS. 1 and 2); and a raised position in which the arm stands in a substantially vertical position, cantileverly from the upper wall 2a of the boxlike housing 2.

Obviously, cup-shaped body 7 is fixed cantileverly and upside-down to the supporting arm 8, so as to be arranged, when arm 8 is in the lowered position, with the peripheral rim in abutment against the surface of the upper wall 2a of the boxlike housing 2, thus completely surrounding the inlet of the processing tub 3 so as to completely cover the processing tub 3.

Cooling circuit 4, mixing member 5 and drive unit 6 are components widely known in the field, and therefore they will not be described in further detail.

Figure 3:
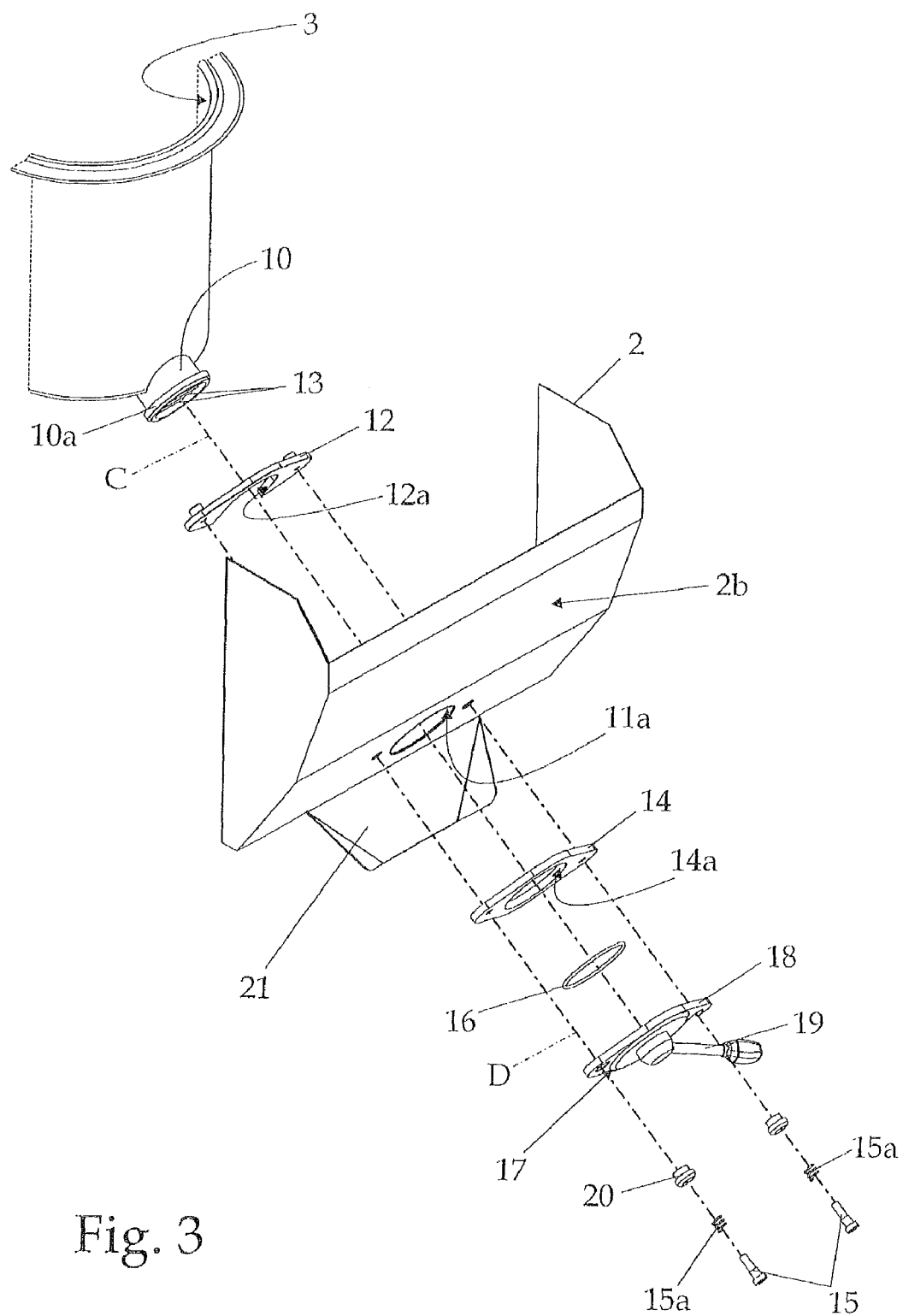
FIG. 3 is an exploded view of the front wall of the machine shown in FIGS. 1 and 2, with parts in section and parts removed for clarity.

With reference to FIGS. 2 and 3, machine 1 is further provided with an ice-cream discharge manifold 9 which branches from the bottom of the processing tank 3 to reach and pass the boxlike housing 2 at the front wall 2b of the latter, and is structured so as to allow a controlled outflow of the ice-cream contained in the processing tank 3 out of machine 1.

Ice-cream discharge manifold 9 comprises a tubular duct 10 which protrudes from the bottom of the processing tank 3, and ends in a mouth assembly 11 which through-engages an appropriate opening 11a realized on the front wall 2b of the boxlike housing 2. In the example shown, in particular, tubular duct 10 is preferably, though not necessarily, made of metal material and is preferably, though not necessarily, rectilinear and of circular section; while the opening 11a on the front wall 2b of boxlike housing 2 is preferably, though not necessarily, circular in shape.

Unlike the currently known vertical-axis batch freezers, the mouth assembly 11 located at the end of tubular duct 10 instead comprises a central sleeve with a preferably, though not necessarily, circular section, which is rigidly and irremovably fixed to the body of tubular duct 10 and protrudes from the end of the tubular duct 10 outwards of boxlike housing 2, engaging in through manner the opening 11a on the front wall of boxlike housing 2; and an outer coupling flange which is positioned on tubular duct 10, upstream of the central sleeve, and is adapted to be arranged in abutment on the inner surface of the front wall 2b of boxlike housing 2, along the peripheral edge of opening 11a.

More specifically, the flange of mouth assembly 11 is rigidly and irremovably fixed to the body of tubular duct 10, and preferably, though not necessarily, lies on a plane which is locally substantially perpendicular to the longitudinal axis C of the duct.

With reference to FIGS. 2 and 3, mouth assembly 11 is further provided with an inner protective grid which is placed as cover of the inlet of the central sleeve of mouth assembly 11, so as to prevent foreign bodies from rising along the tubular duct 10 at the back, and is rigidly and irremovably fixed to the body of the aforesaid sleeve.

More specifically, in the example shown, the end segment 10a of tubular duct 10 has a greater length than the thickness s of the front wall 2b of boxlike housing 2 around the opening 11, and is externally provided with a protruding annular ridge which, in turn, has a length l detected parallel to the longitudinal axis C of the duct, which is greater than the thickness s of the front wall 2b of boxlike housing 2 around the opening 11 and which is substantially equal to the overall length of the end segment 10a of the tubular duct 10. Furthermore, the end segment 10a of tubular duct 10, engages in through manner the opening 11a on the front wall 2b of boxlike housing 2, and protrudes outside the boxlike housing 2 thus forming the central sleeve of mouth assembly 11.

In other words, the opening 11a on the front wall 2b of boxlike housing 2 is dimensioned so as to be engaged in through manner by the end segment 10a of tubular duct 10, including the annular ridge.

The coupling flange of mouth assembly 11, instead, preferably, though not necessarily, consists of a flat plate 12 of preferably, though not necessarily, ellipsoid in shape, which is provided with a transversal through slot 12a which extends from the side edge of the plate to the centre thereof, and is dimensioned so as to be engaged by the median segment of tubular duct 10, i.e. by the duct segment arranged immediately upstream of the end segment 10a, but not by the end segment 10a of tubular duct 10.

More specifically, flat plate 12 is structured to be placed astride of the median segment of the tubular duct 10 with a guillotine movement along a plane locally substantially perpendicular to the longitudinal axis C of the duct, and then to be positioned with the front face simultaneously abutting on the inner surface of the front wall 2b of boxlike housing 2, and on the side of the annular ridge realized on the end segment 10a of tubular duct 10, so as to align the end segment 10a of tubular duct 10 with the edge of the front wall 2b of boxlike housing 2 which delimits opening 11a.

In other words, flat plate 12 is structured so as to be made separately from tubular duct 10, and to be fixed to the body of tubular duct 10 preferably, though not necessarily, via weld spots, after having been positioned astride of tubular duct 10 with the front face in abutment on the side of the annular ridge on the end segment 10a of tubular duct 10.

The protective grid of mouth assembly 11, instead, preferably, though not necessarily, consists of a number of rectilinear bars 13 which are parallel to and spaced from one another, lay on a sole reference plane locally perpendicular to the longitudinal axis C of tubular duct 10, are inserted in through manner into the end segment 10a of tubular duct 10, and have their axial ends welded to the cylindrical side wall of tubular duct 10 so as to form a single body with the latter.

With reference to FIGS. 2 and 3, mouth assembly 11 of ice-cream discharge manifold 9 further comprises an outer locking plate 14, which is centrally provided with a through hole 14a complementary in shape to that of the central sleeve of mouth assembly 11, and which is directly fitted on the central sleeve 10a of mouth assembly 11, with the rear face in abutment on the outer surface of the front wall 2b of boxlike housing 2; and a number of anchoring members 15, which are structured so as to hold flange 12 and locking plate 14 against each other, thus firmly locking the end of tubular duct 10 on the front wall 2b of boxlike housing 2.

More specifically, in the example shown, the through hole 14a realized in the centre of locking plate 14 has a diameter which approximates by excess the outer diameter of the end segment 10a of tubular duct 10; whereas locking plate 14 has a thickness w which approximates by excess the difference between the length of the end segment 10a of tubular duct 10, and the thickness s of the front wall 2a of boxlike housing 2 around the opening 11a, so that the end of end segment 10a of tubular duct 10 is substantially coplanar to the front face of locking plate 14, when locking plate 14 and flange 12 of mouth assembly 11 are both abutting on the front wall 2b of boxlike housing 2 held by the anchoring members 15.

As regards instead anchoring members 15, in the example shown mouth assembly 11 of ice-cream discharge manifold 9 is provided with two screws 15 with threaded stem which are mounted to pass through the locking plate 14 and the front wall 2b of boxlike housing 2, and are structured so as to mesh on the flange 12 of mouth assembly 11 so as to hold locking plate 14 against flange 12, thus trapping the front wall 2b of boxlike housing 2 in the middle.

More specifically, screws 15 are perpendicular to the laying plane of locking plate 14 and flange 12 of mouth assembly 11, and engage in through manner the locking plate 14, the front wall 2a of boxlike housing 2, and finally the flange 12, on the opposite sides of, respectively, through hole 14a, opening 11a and finally of transversal slot 12a.

In other words, the two anchoring screws 15 are locally parallel to the longitudinal axis C of the duct, and are approximately placed at the two focuses of the ellipse formed by the peripheral edge of the locking plate 14, and by the peripheral edge of the flange or flat plate 12 of mouth assembly 11.

Furthermore, in the example shown, each anchoring screw 15 is preferably, though not necessarily, provided with a helical spring 15a or other elastic element, which is fitted on the stem of the screw and is capable of keeping the locking plate 14 in abutment on the flange or flat plate 12 of mouth assembly 11 with a compression force which is substantially constant over time.

With reference to FIGS. 2 and 3, mouth assembly 11 of ice-cream discharge manifold 9 finally comprises an annular seal 16, which is fitted on the end of end segment 10a of tubular duct 10; and a movable door 17 which is structured so as to sealingly close the end of end segment 10a of tubular duct 10, and is hinged to locking plate 14 so as to be manually movable between a closing position in which the movable door 17 sealingly closes tubular duct 10 thus preventing the outflow of the ice-cream, and a fully open position in which the movable door 17 is spaced from the end of the tubular duct 10 and allows the ice-cream outflow through the whole section of tubular duct 10.

More specifically, movable door 17 consists of a flat plate 18 directly resting on locking plate 14, so as to fluid-tight seal the end of end segment 10a of tubular duct 10, and is hinged on locking plate 14, by the side of its through hole 14a, so as to be able to rotate about an axis D which is locally perpendicular to the laying plane of the two plates, while remaining always locally tangent to locking plate 14 and to the annular seal 16 fitted on the end of tubular duct 10; and a handle 19 which protrudes from the flat plate 18 to allow the handling thereof about the axis D.

In particular, in the example shown, flat plate 18 copies the shape of the perimeter of locking plate 14, and is fixed in freely rotating manner on locking plate 14 by means of one of the two anchoring screws 15 which hold locking plate 14 against the flange 12 of mouth assembly 11. Such an anchoring screw 15, in fact, is dimensioned so as to engage in through manner also flat plate 18 preferably, though not necessarily, by means of the interposition of a guiding bushing 20 within which the helical spring 15a is accommodated.

With reference to FIGS. 1 and 3, in the example shown, machine 1 is finally provided also with a shelf-like drip 21 which protrudes from the front wall 2b of boxlike housing 2, immediately underneath the mouth assembly 11 of ice-cream discharge manifold 9, so as to convey the ice-cream residues onto a collecting tank which, in turn, is cantileverly attached to the front wall 2b of boxlike housing 2, underneath the mouth assembly 11 of ice-cream discharge manifold 9 and drip 21.

In particular, in the example shown, drip 21 comprises a single piece of metal plate 21, which is substantially chute-like folded and is welded, to the side and seamlessly, directly to the front wall 2b of boxlike housing 2, so as to avoid foulings and deposits of dirt along the joint.

Operation of machine 1 can be easily inferred from the above description, and no further explanations are required except for saying that flat plate 12 is fixed to tubular duct 10 by means of weld spots, once mouth assembly 11 has been completely assembled and locked on the front wall 2b of boxlike housing 2, by fastening the anchoring screws 15.

Advantages resulting from the particular structure of the ice-cream discharge manifold 9 are large in number.

First, the particular structure of ice-cream discharge manifold 9 increases the level of passive safety of machine 1, because the particular structure of mouth assembly 11 allows to very easily disassemble and clean everything on the front wall 2b of the boxlike housing 2, around the opening 11a, with no risk for the operator to accidentally put his/her hand into the tubular duct 10 and reach the processing tank 3.

Such a feature allows installation on machine 1 of only one protection system which is able to stop the electric motor of drive unit 6 when movable lid 7 does not rest on the upper wall 2a of boxlike housing 2, as a covering for the inlet of the processing tank 3.

The particular structure of ice-cream discharge manifold 9 further simplifies assembling operations of processing tank 3 within boxlike housing 2, thus allowing a reduction of the machine assembly costs.

Clearly, changes may be made to the machine 1 for producing ice-cream and the like as described herein without, however, departing from the scope of the present invention.

For example, in a first non-shown constructional variation the end segment 10a of tubular duct 10 may be deprived from the outer annular ridge, and the flange of mouth assembly 11 may comprise a flat plate 12 which follows the shape of locking plate 14, including the through hole 14a, and is directly welded onto the body of tubular duct 10 at the separating line between the median segment and the end segment 10a of tubular duct 10.

Furthermore, in a second non-shown constructional variation, tubular duct 10 may have a small protruding annular ridge at the separation line between the median segment and the end segment 10a of tubular duct 10. In this case, the annular ridge has a length l detected parallel to the longitudinal axis C of the duct, which is smaller than the overall length of the end segment 10a of tubular duct 10, and preferably, though not necessarily, also smaller than the thickness s of the front wall 2b of boxlike housing 2 around the opening 11.

The invention claimed is:

1. A machine (1) for producing ice-cream and the like comprising an outer boxlike housing (2) and, within the boxlike housing (2),
    a processing tank (3) that extends within the boxlike housing (2) from the upper wall (2a) thereof; and
    a discharge manifold (9) that branches from the bottom of the processing tank (3) up to the boxlike housing (2) at the front wall (2b) thereof, and is structured so as to allow the outflow of the product contained in the processing tank (3) outside the machine (1);
    the discharge manifold (9) comprising a tubular duct (10) protruding from the bottom of the processing tank (3) and ending in a mouth assembly (11) that through-engages an appropriate opening (11a) realized on the front wall (2b) of the boxlike housing (2); the machine (1) for producing ice-cream and the like being characterized in that said mouth assembly (11) comprises
    a central sleeve (11a) that is rigidly and fixedly attached to the tubular duct (10), and protrudes from the end of the tubular duct (10) towards the outside of the boxlike housing (2), through-engaging said opening (11a) on the front wall (2b) of the boxlike housing (2);
    an outer coupling flange (12) which is rigidly and fixedly attached to the outside tubular duct (10), upstream of the central sleeve (10a), and is adapted to be arranged in abutment on the inner surface of the front wall (2b) of the boxlike housing (2) along the peripheral edge of said opening (11a);
    an inner protective grid (13) which is positioned on the central sleeve (10a) of the mouth assembly (11) so as to prevent foreign bodies from rising along the tubular duct (10) at the back, and is rigidly and permanently attached to the body of said central sleeve (10a);
    an outer locking plate (14), which is centrally provided with a through-hole (14a) having a complementary shape to that of the central sleeve (10a) of the mouth assembly (11), and is fitted directly on the central sleeve (10a) of the mouth assembly (11), with the rear face in abutment on the outer surface of the front wall (2b) of the boxlike housing (2); and
    anchoring means (15) structured so to hold the flange (12) of the mouth assembly (11) and the locking plate (14) one against the other, firmly locking the end of the tubular duct (10) on the front wall (2b) of the boxlike housing (2).

2. A machine according to claim 1, characterized in that it also comprises, within the boxlike housing (2), cooling means (4) able to cool the processing tank (3) so as to bring and hold the content thereof at a temperature lower than 0° C., and a mixing member (5) which is rotatably mounted within the processing tank (3) about a rotation axis (A) substantially coinciding with the reference axis (A) of the tank; said mixing member (5) being structured so as to mix the various ingredients which are poured within the processing tank (3) and so as to scrape at least the inner side surface of the processing tank (3).

3. A machine according to claim 1, characterized in that the central sleeve (11a) of the mouth assembly (11) comprises the end segment (10a) of the tubular duct (10), which has a length longer than the thickness (s) of the front wall (2b) of the boxlike housing (2) around the opening (11), and through-engages said opening (11a) on the front wall (2b) of the boxlike housing (2) projecting outside the machine.

4. A machine according to claim 3, characterized in that the tubular duct (10) is provided with a projecting annular ridge at the separation line between the end segment (10a) and the median segment of said tubular duct (10), and in that the flange (12) of the mouth assembly (11) comprises a flat plate (12) which is provided with a transversal through-slot (12a) extending from the side edge of the plate up to the centre thereof, and is dimensioned so as to be engaged by the median segment of the tubular duct (10); said flat plate (12) being adapted to be placed astride of the median segment of the tubular duct (10) with a guillotine movement, and then to be positioned with the front face in abutment simultaneously against the inner surface of the front wall (2b) of the boxlike housing (2), and against the side of the annular ridge on the end segment (10a) of the tubular duct (10).

5. A machine according to claim 4, characterized in that the projecting annular ridge has a length (l) measured parallelly to the longitudinal axis (C) of the tubular duct (10), which is substantially equivalent to the overall length of the terminal segment (10a) of the tubular duct (10).

6. A machine according to claim 3, characterized in that the flange (12) of the mouth assembly (11) comprises a centrally perforated flat plate (12) which is fitted on the tubular duct (10) and is permanently attached at the separation line between the end segment (10a) and the median segment of said tubular duct (10).

7. A machine according to claim 3, characterized in that said locking plate (14) has a thickness (w) that approximates by excess the difference between the length of the end segment (10a) of the tubular duct (10), and the thickness (s) of the front wall (2a) of the boxlike housing (2) around the opening (11a), so that the end of the end segment (10a) of the tubular duct (10) is substantially coplanar with the front face of the locking plate (14), when the locking plate (14) and the flange (12) of the mouth assembly (11) are both in abutment on the front wall (2b) of the boxlike housing (2).

8. A machine according to claim 7, characterized in that the through-hole (14a) at the centre of the outer locking plate (14), has a diameter that approximates by excess the outer diameter of the end segment (10a) of the tubular duct (10).

9. A machine according to claim 1, characterized in that the mouth assembly (11) also comprises a movable door (17) which is structured so as to sealingly close the end of the central sleeve (10*a*) of the mouth assembly (11), and is hinged on the locking plate (14) so as to be manually displaceable from and towards a closed position in which the movable door (17) sealingly closes the tubular duct (10) avoiding the outflow of the product.

10. A machine according to claim 9, characterized in that the movable door (17) comprises a flat plate (18) which rests directly on the locking plate (14) so as to fluid-sealingly obstruct the end of the central sleeve (10*a*) of the tubular duct (10), and is hinged on said locking plate (14) on the side of the through-hole (14*a*) thereof, so as to rotate about a rotation axis (D) locally perpendicular to the laying plane of the two plates, always remaining locally tangent to the locking plate (14); and a handle (19) that protrudes from said flat plate (18) to allow the handling thereof about said rotation axis (D).

11. A machine according to claim 1, characterized in that the anchoring means (15) comprise a plurality of screws (15) which are mounted so as to pass through the locking plate (14) and the front wall (2*b*) of the boxlike housing (2), and are structured for meshing on the flange (12) of the mouth assembly (11) so as to hold the locking plate (14) against said flange (12), trapping the front wall (2*b*) of the boxlike housing (2) in the middle.

12. A machine according to claim 10, characterized in that the flat plate (18) of the movable port (17) is attached so as to freely rotate on said locking plate (14) by means of one of the screws (15) which hold the locking plate (14) against the flange (12) of the mouth assembly (11).

13. A machine according to claim 1, characterized in that the protective grid of said mouth assembly (11) comprises a number of rectilinear bars (13) which are parallel to and spaced from one another, lie on the same reference plane which is locally perpendicular to the longitudinal axis (C) of the tubular duct (10), are inserted so as to pass through the central sleeve (10*a*) of the mouth assembly (11), and have the axial ends welded to the cylindrical side wall thereof.

14. A machine according to claim 2, characterized in that the cooling means (4) are able to cool the processing tank (3) so as to bring and hold the content thereof at a temperature ranging between −5° C. and −35° C.

* * * * *